US012689253B2

(12) United States Patent
Risko Cattell et al.

(10) Patent No.: US 12,689,253 B2
(45) Date of Patent: Jul. 21, 2026

(54) ROTOR WITH MAGNET POSITIONING TAB SYSTEM

(71) Applicant: GM GLOBAL TECHNOLOGY OPERATIONS LLC, Detroit, MI (US)

(72) Inventors: Rebecca K. Risko Cattell, Royal Oak, MI (US); Edward L. Kaiser, Orion, MI (US); Cheongun Han, Novi, MI (US); Matthew James Bozich, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 18/611,532

(22) Filed: Mar. 20, 2024

(65) Prior Publication Data

US 2025/0300506 A1 Sep. 25, 2025

(51) Int. Cl.
*H02K 1/276* (2022.01)

(52) U.S. Cl.
CPC .................................... *H02K 1/276* (2013.01)

(58) Field of Classification Search
CPC .............................. H02K 1/276; H02K 1/2766
USPC ........ 310/156.53, 156.54, 216.004, 216.008, 310/216.009, 216.106
See application file for complete search history.

(56) References Cited

U.S. PATENT DOCUMENTS

| | | | | | |
|---|---|---|---|---|---|
| 5,581,140 | A | * | 12/1996 | Futami | H02K 15/03 310/156.53 |
| 5,864,191 | A | * | 1/1999 | Nagate | H02K 1/276 310/216.106 |
| 11,043,863 | B2 | * | 6/2021 | Ushida | H02K 15/12 |
| 11,133,724 | B2 | | 9/2021 | Lahr et al. | |
| 2011/0193439 | A1 | * | 8/2011 | Yabe | H02K 1/276 310/156.38 |
| 2020/0373798 | A1 | * | 11/2020 | Ushida | H02K 1/30 |

FOREIGN PATENT DOCUMENTS

| | | | | |
|---|---|---|---|---|
| DE | 102016102655 A1 | | 8/2016 | |
| DE | 102019112657 A1 | | 12/2019 | |
| DE | 102022131792 A1 | | 6/2024 | |
| FR | 3079686 A1 | * | 10/2019 | ............. H02K 1/276 |
| FR | 3129792 A1 | | 6/2023 | |

OTHER PUBLICATIONS

18611532_2025-12-03_FR_3079686_A1_H.pdf (Year: 2025).*

* cited by examiner

*Primary Examiner* — Christopher M Koehler
*Assistant Examiner* — Ahmed F Seck
(74) *Attorney, Agent, or Firm* — Ingrassia Fisher & Lorenz, LLP | IF&L

(57) ABSTRACT

A rotor for an electric machine includes a rotor core having one or more cavities internal to the rotor core, the cavities defined by a wall of the rotor core. Laminations are stacked together to form the rotor core, and the laminations define the cavities. A body or bodies, which may be magnets, extend within the cavities. A subset of the laminations each include a tab system with at least one tab configured to preload the body to a seated position against the wall, and to maintain the bodies in the seated position within the cavity.

20 Claims, 8 Drawing Sheets

ROTOR WITH MAGNET POSITIONING TAB SYSTEM

INTRODUCTION

The present invention relates to electric machines and rotors thereof, and more particularly relates to a rotor with a multitude of internal cavities, which may house permanent magnets, where the rotor includes features that position the magnets in desired positions in their slots for high performance operation.

A rotor, such as for an interior permanent magnet (IPM) machine or a synchronous reluctance (SR) machine, includes a rotor core assembled around the rotation shaft. Such a rotor with segmental construction typically includes a number of stacked laminations forming a core body. The core body typically includes cavities as flux barriers to influence operational characteristics of the machine. The individual laminations of the core body are formed in a disc shape with a center opening for assembly on a rotation shaft. The flux barriers are distributed around the shaft opening, may have ends located toward the outer circumference of the lamination, and may extend toward the shaft opening. The flux barrier cavities may or may not include the magnets.

The physical dimensions, number, and positioning of the flux barrier cavities influence the performance of an electric machine. Flux barriers may be placed in an optimum position to result in optimal performance. This may lead to flux barrier design and positioning that results in only thin structural features being left to support parts of the rotor core. These thin lamination features may limit the performance and speeds achievable by the electric machine without overly stressing the rotor core, or without overly increasing feature size, particularly if the magnets are not optimally positioned. Due to the presence of magnets in the flux barrier cavities, maintaining balance is challenging.

Accordingly, it is desirable to provide economical rotors for electric machines that achieve high performance without balance variations. Furthermore, other desirable features and characteristics of the present invention will become apparent from the subsequent detailed description and the appended claims, taken in conjunction with the accompanying drawings and the foregoing technical field and background.

SUMMARY

In various embodiments, a rotor for an electric machine includes a rotor core having one or more cavities internal to the rotor core. The cavities are defined by a wall that is defined by the rotor core. Laminations are stacked together to form the rotor core, and the laminations define the cavities. A body or bodies may extend within the cavities. A subset of the laminations includes a tab system with one or more tabs that preload the body to a seated position against the wall, and that maintain the body in the seated position within the cavity.

In additional embodiments, the body is a magnet.

In additional embodiments, the body includes chamfered corners, and there is only one singular tab on each of the laminations in the subset of laminations. The singular tab engages the body at one of the chamfered corners.

In additional embodiments, the body includes chamfered corners. There is a single tab on individual laminations that extends into the cavity and that engages the body at one of the chamfered corners. The wall includes an angled section that engages the body at another of the chamfered corners.

In additional embodiments, there is a first tab that engages the body at a first of its sides and a second tab that engages the body at a second of its sides. The first side and the second side share a common corner of the body.

In additional embodiments, the tab is not included on a majority of the individual laminations.

In additional embodiments, the wall defines a stop at one side of the body. The tab is disposed at another side of the body. The two mentioned sides are opposite each other so that the tab preloads the body against the stop.

In additional embodiments, the tab defines a press-fit between the body and the wall to establish the preload.

In additional embodiments, the wall includes a radially inner lateral wall section, a radially outer lateral wall section, a radially inboard tip, and a radially outboard tip, all defining the cavity. The preload forces the body against the radially outer lateral wall section and toward the radially outboard tip.

In additional embodiments, the rotor may alternately be in a stationary state and may operate by rotating at a speed state. The preload is tuned to maintain the body in the seated position during both the stationary state and the speed state.

In a number of additional embodiments, a rotor for an electric machine includes a rotor core having cavities internal to the rotor core. The cavities are defined by a wall of the rotor core. Laminations are stacked together to form the rotor core, where the laminations together define the cavities. A body that may be a magnet extends within at least some of the cavities. A subset of the laminations includes a tab system with one or more tabs that preload the body to a seated position against the wall, and that maintain the body in the seated position.

In additional embodiments, the body includes chamfered corners. The subset of the laminations includes individual laminations that each include one tab only that engages the body at one of the chamfered corners.

In additional embodiments, the magnet includes chamfered corners. There is a single tab on each lamination in the subset of laminations. The tab engages the body at one of the chamfered corners. The wall includes an angled section that engages the body at another of the chamfered corners. The wall includes a radially outer lateral wall section, and the tab forces the magnet against the angled section and against the radially outer lateral wall section.

In additional embodiments, the magnet includes a first side and a second side. A first tab engages the magnet at the first side and a second tab that engages the magnet at the second side. The first side and the second side share a common corner of the magnet.

In additional embodiments, the subset of the laminations is a minority of the laminations so that the tabs are not included on a majority of the laminations.

In additional embodiments, the wall defines a stop at a first side of the magnet. The tab is disposed at a second side of the magnet. The first side is opposite the second side so that the tab applies a preload to the magnet to position it against the stop.

In additional embodiments, the tab defines a press-fit between the magnet and the wall to establish the preload. A gap is defined between the wall and the magnet adjacent the tab.

In additional embodiments, the rotor rotates about an axis. To define the cavity, the wall includes a radially inner lateral wall section, a radially outer lateral wall section that is further from the axis than the radially inner lateral wall section, a radially inboard tip, and a radially outboard tip that is further from the axis than the radially inboard tip. The preload forces the magnet against the radially outer lateral wall section and toward the radially outboard tip.

In additional embodiments, the rotor is alternately in a stationary state and operates by rotating at a speed state. The preload is tuned to maintain the magnet in the seated position during both the stationary state and the speed state.

In a number of other embodiments, a rotor for an electric machine includes a rotor core having cavities internal to the rotor core. The cavities are defined by a wall of the rotor core. Laminations are stacked together to form the rotor core and to define the cavities. A magnet extends within each of at least some of the cavities. Each lamination in a first subset of the laminations includes a tab system with a tab configured to preload the magnet to a seated position against the wall, and to maintain the magnet in the seated position. Each lamination in a second subset of the laminations does not include the tab.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
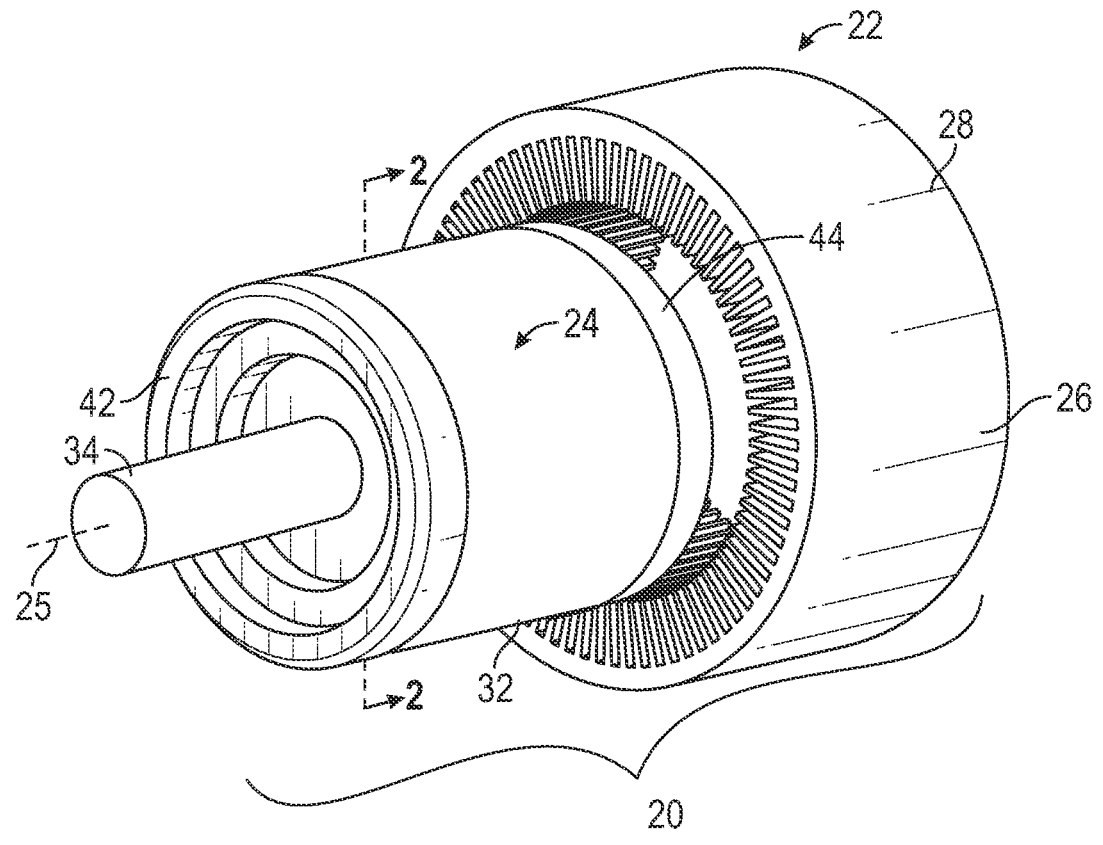
FIG. 1 is a schematic illustration of parts of an electric machine, in accordance with various embodiments.

With reference to FIG. 1, schematically illustrated are select components of an electric machine 20 including a stator assembly 22 and a rotor assembly 24 configured to rotate about an axis 25. In the illustration, the rotor assembly 24 is shown outside the stator assembly 22 for visibility. In this embodiment, the electric machine 20 is configured as a motor in which the current in the rotor assembly 24 that produces torque is induced from the magnetic field created by energization of the stator assembly 22. In a number of embodiments, the electric machine 20 is an alternating current machine suitable for use in applications requiring regulated speed control such as for a vehicle traction motor, although this disclosure is not limited to those applications.

The stator assembly 22 is a generally annular shaped component, which may be constructed for single-phase power or multiple phase power such as three-phase. In this embodiment, the stator assembly 22 includes a core 26 made of a stack of laminations 28. The laminations 28 may be formed by stampings that are slotted to receive windings (not shown) and which may be made of a soft magnetic material such as silicon steel. The laminations 28 may be insulated from one another by a thin non-conductive coating. In other embodiments, another ferromagnetic material may be used. The stator assembly 22 may include the windings for energization.

The rotor assembly 24 includes a core 30 which includes a stack of many laminations 32 configured to receive a shaft 34. The laminations 32 may be stamped or otherwise formed. Each lamination 32 may be symmetrical about its center for balance but other nonsymmetrical options may be employed while still providing a balanced design. The laminations 32 are made of a ferromagnetic material and may be insulated from one another by a thin non-conductive coating or may be made of another material. End rings 42, 44 are formed at the ends of the core 30. In the current embodiment, the end rings 42, 44 are fabricated of an aluminum material for light weight. The rotor assembly 24 is configured with a number of poles to create the magnetic circuit of the rotor assembly 24, which depends on the angular position of the rotor assembly 24, for interacting with the field induced by the stator assembly 22 of the electric machine 20. These poles may be created, at least in-part, by flux barriers as described below. Operation of the electric machine 20 over a wide speed range (speed state) with mechanical robustness is desired.

Figure 2:
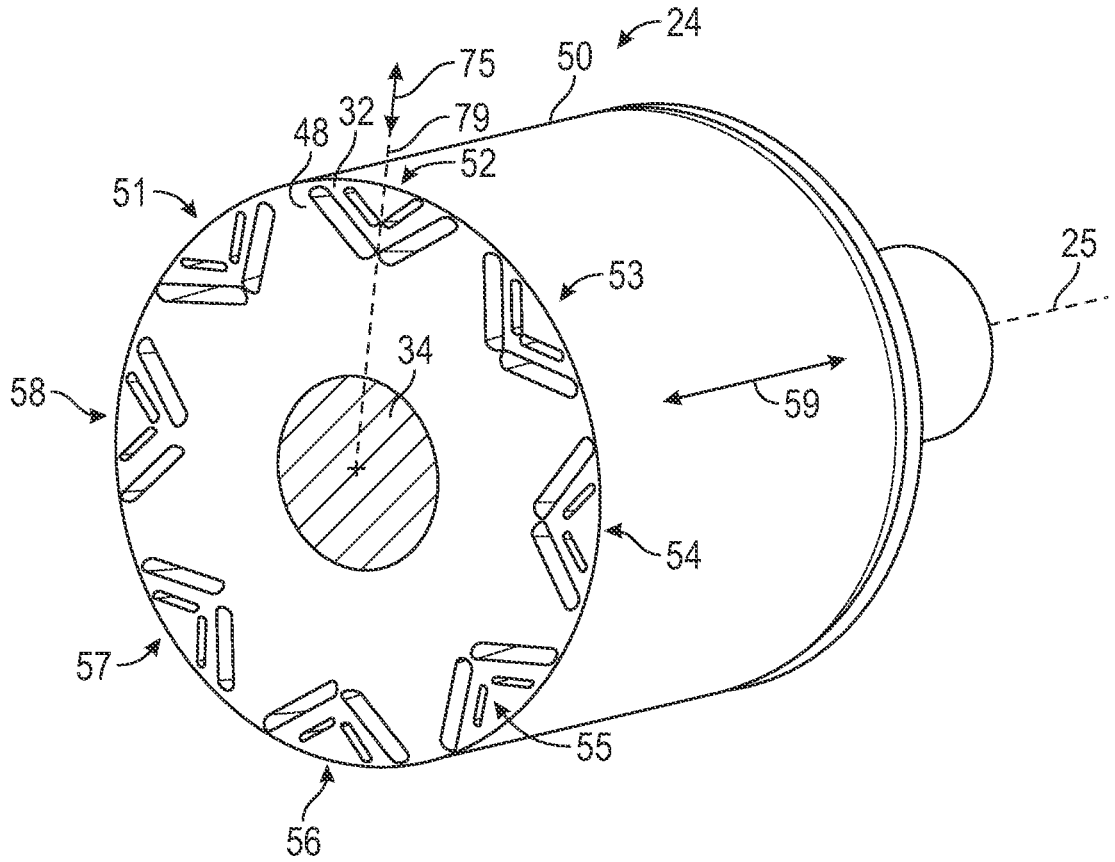
FIG. 2 is a fragmentary, cross-sectional illustration taken generally along the line 2-2 on the electric machine of FIG. 1, in accordance with various embodiments.

In FIG. 2, the rotor assembly 24 is shown in cross section and separate from the stator assembly 22. A face 48 of one of the laminations 32 is exposed and visible. The lamination 32 includes a number of openings, referred to as cavities, that may serve multiple purposes. Distributed around the rotor assembly 24 near its outer perimeter 50 are eight cavity groups 51-58, each formed in two angled layers. The cavities in the cavity groups 51-58 extend through the stacked rotor laminations 32 of the core 30 in a longitudinal direction 59, which is parallel to the axis 25. Accordingly, each cavity in the cavity groups 51-58 has a length in the axial direction (parallel to the axis 25). The cavity groups 51-58 operate as barriers to magnetic flux and help define the magnetic poles of the rotor assembly 24. The geometry of the laminations 32 is defined by the position, thickness and shape of the flux barriers. Parameters such as torque density and efficiency are influenced by the rotor topology. The cavities may generally be shaped to readily accept the insertion of permanent magnets, to obtain a magnet assisted machine.

In the current embodiment, the rotor assembly 24 has eight poles but another number may be used. The cavity groups 51-58 are arrayed to encircle the shaft 34 and are evenly spaced in the lamination 32 around the shaft 34. The cavity groups 51-58 are positioned close to (adjacent) the outer perimeter 50 in the radial direction 75. The radial direction 75 is defined along any line from the axis 25 that extends outward through the outer perimeter 50 such as along the face 48. The reference line 79 represents a radial line. In addition, the radial direction 75 is perpendicular to the axis 25 in the longitudinal direction 59.

Figure 3:
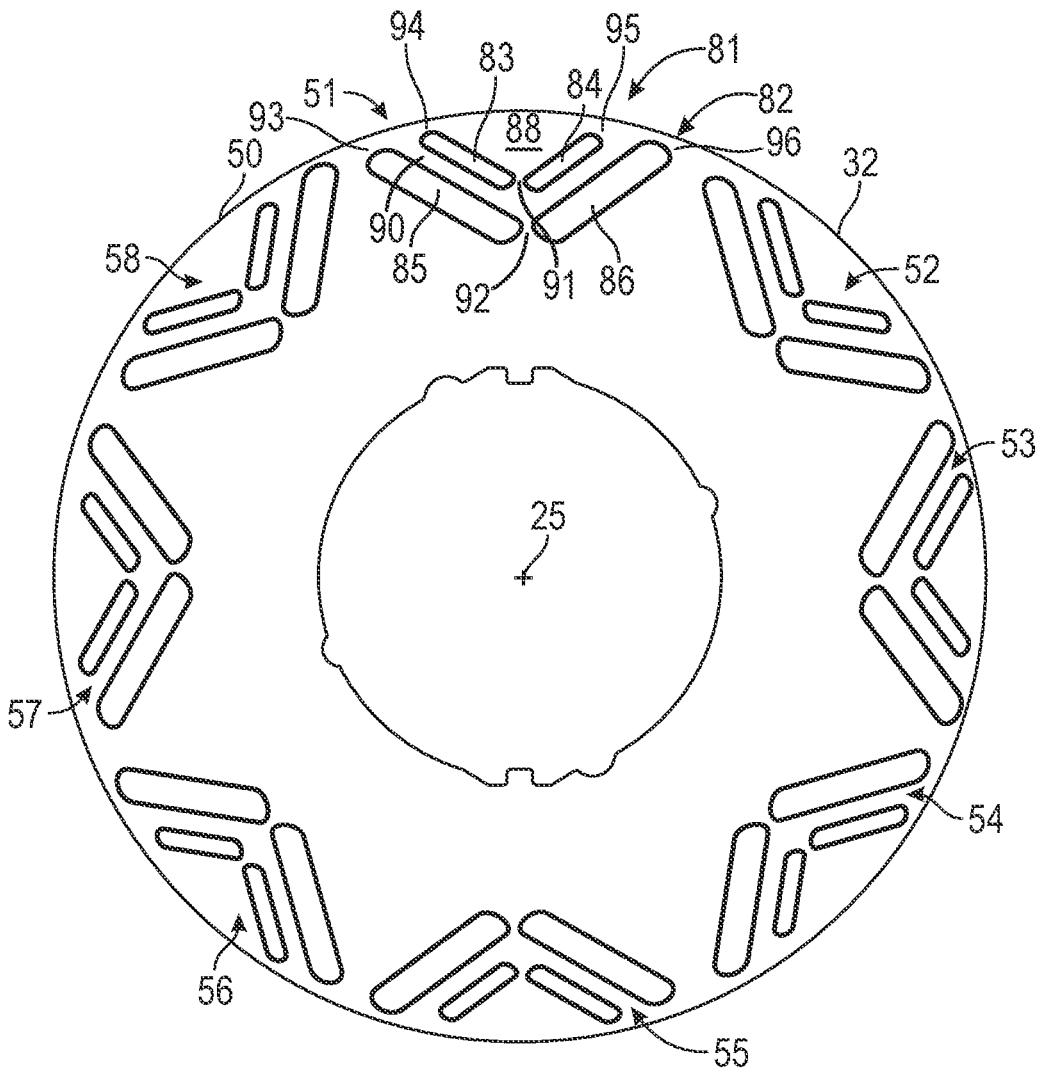
FIG. 3 is a plan view across the face of a lamination of the rotor of FIG. 2, in accordance with various embodiments.

Referring to FIG. 3, one lamination 32 of the rotor assembly 24 is shown schematically. Each of the cavity groups 51-58 is similar and the details of cavity group 51 will be described herein with the understanding that the other cavity groups 52-58 include like elements. The cavity group 51 includes two layers 81, 82 of flux barriers, which in the current embodiment of the electric machine 20 will be referred to as cavities. The layer 81 is a radially outer layer and includes cavities 83 and 84. The layer 82 is a radially inner layer and includes cavities 85 and 86. As a result, the cavity group 51 includes four cavities 83-86, which are shown without bodies/magnets for simplicity in this view. The cavities 83, 84 are disposed at an angle relative to one another defining a sector shaped flux path element 88 defined by a remaining generally triangular steel section of the lamination 32. The magnet cavities 85, 86 are also disposed at an angle relative to one another. A vee shaped flux path element 90 is defined between the layers 81, 82 by a remaining steel section of the lamination 32. The layers 81, 82 define structural features of the remaining steel of the lamination 32 in the form of struts 91, 92 and bridges 93-96. The struts 91, 92 and the bridges 93-96 hold the outer sections of the lamination 32, such as the flux path elements 88, 90, together against rotationally induced forces during operation of the electric machine 20. The maximum rotational speed of the electric machine 20 may be limited by the ability of the rotor assembly 24 to maintain structural integrity, including of the relatively thin struts 91, 92 and bridges 93-96.

Figure 4:
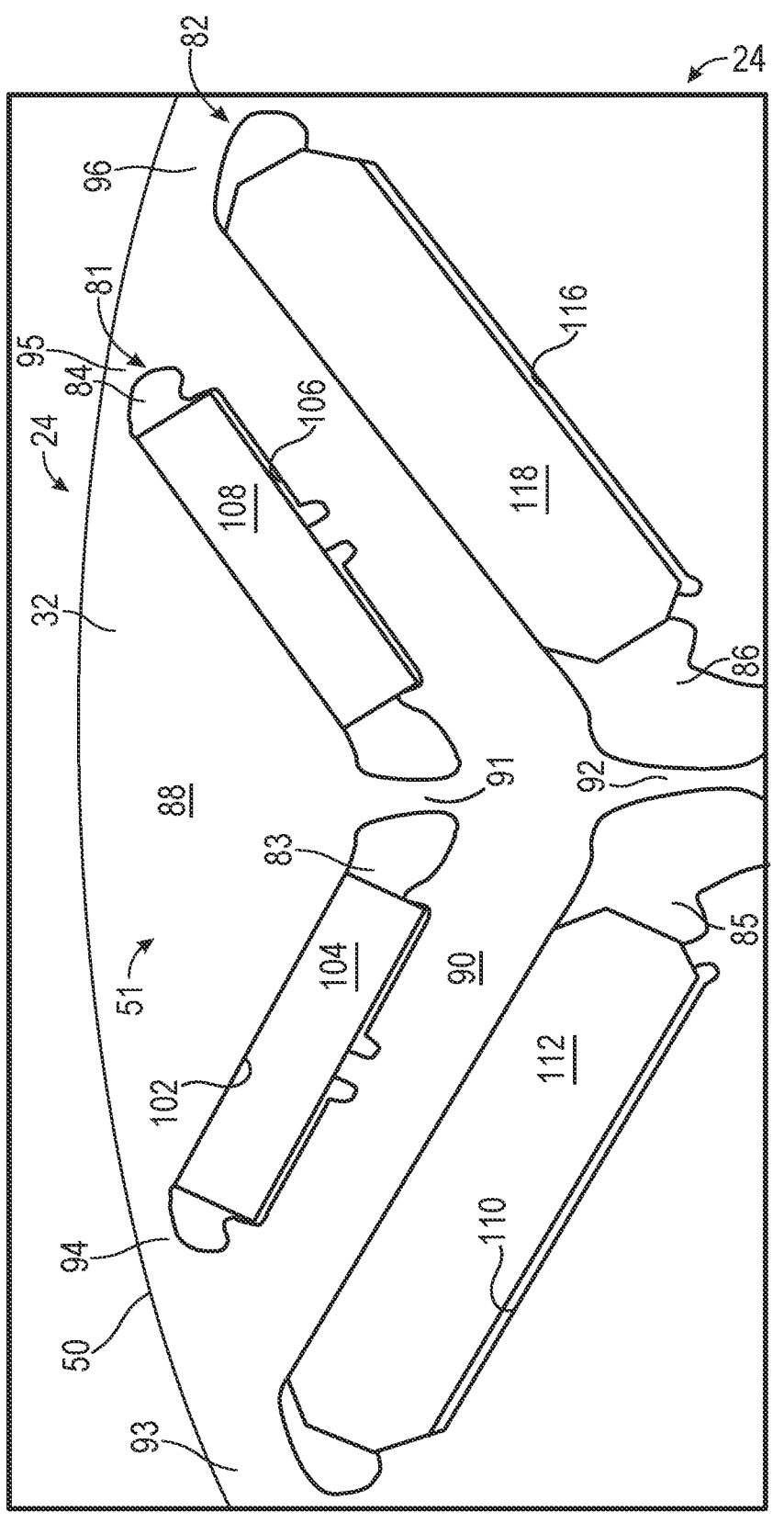
FIG. 4 is a fragmentary, sectional, schematic illustration of a part of the rotor of FIG. 2 across a part of a lamination, in accordance with various embodiments.

Referring to FIG. 4, the area of the cavity group 51 is shown in greater detail. The cavity 83 is defined by a wall 102 that is a part of the laminations 32 and that defines the perimeter of the cavity 83 in a plane of the lamination 32. The wall 102 defines the open space of the cavity 83 which contains a body 104. In the current embodiment, the body 104 is a magnet. The cavity 84 is defined by a wall 106 that is a part of the laminations 32 and that defines the perimeter of the cavity 84 in a plane of the lamination 32. The wall 106 defines the open space of the cavity 83, which contains a body 108. In the current embodiment, the body 108 is a magnet. The cavity 85 is defined by a wall 110 that is a part of the laminations 32 and that defines the perimeter of the cavity 85 in a plane of the lamination 32. The wall 110 defines the open space of the cavity 85 which contains a body 112. In the current embodiment, the body 112 is a magnet. The cavity 86 is defined by a wall 116 that is a part of the laminations 32 and that defines the perimeter of the cavity 86 in a plane of the lamination 32. The wall 116 defines the open space of the cavity 86 which contains a body 118. In the current embodiment, the body 118 is a magnet. The cavities 83-86, or a part thereof in such an embodiment, may referred to as magnet slots.

Figure 5:
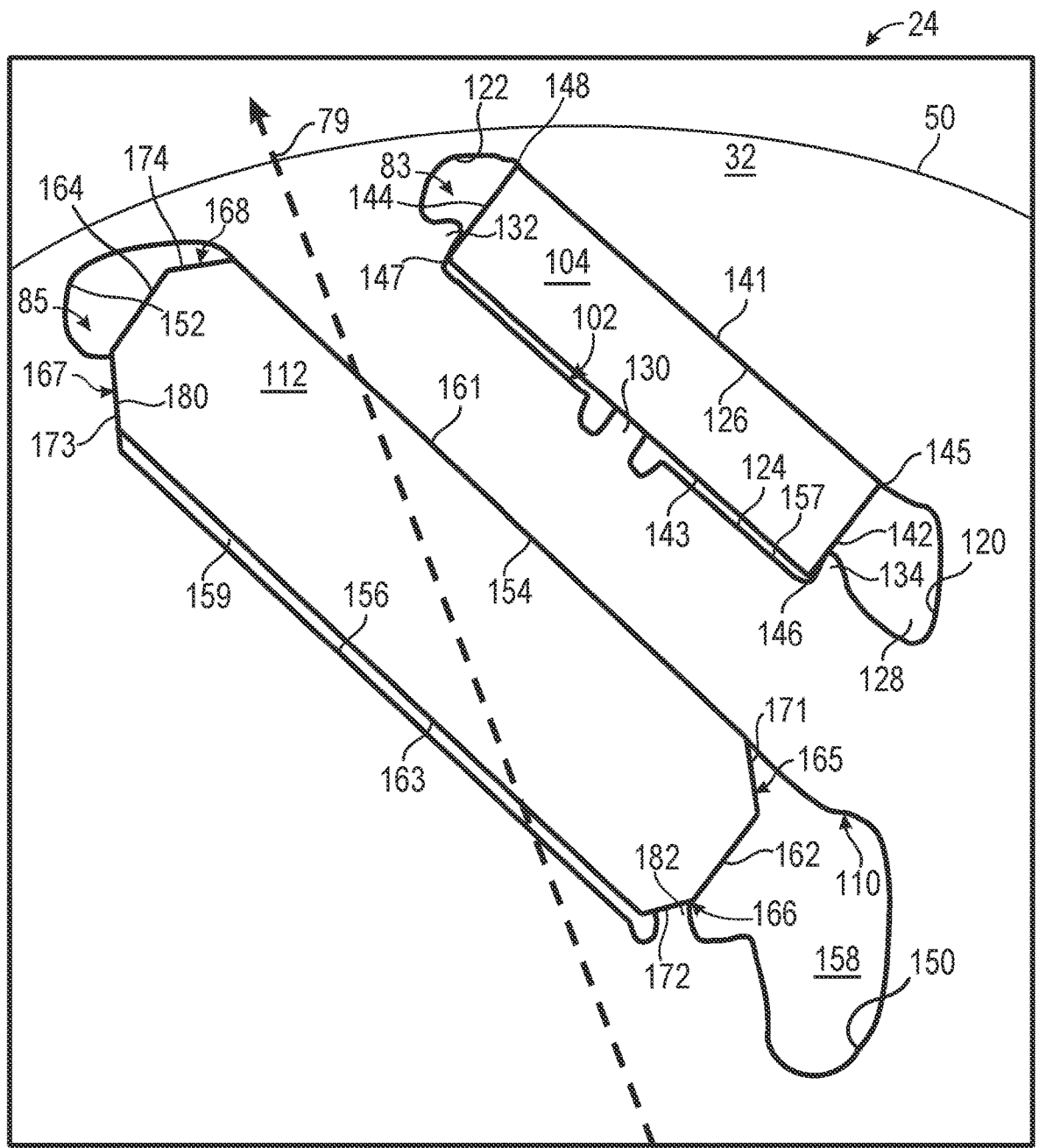
FIG. 5 is a fragmentary, sectional, schematic illustration of another part of the rotor of FIG. 2 across a part of a lamination with tabs, in accordance with various embodiments.

Referring to FIG. 5, the area of the cavities 83 and 85 is shown in greater detail. It will be understood that the details of the cavities 84 and 86 are similar in a mirror image relation, respectively. It will also be understood that the details of the cavities in the cavity groups 52-58 are also similar to those of the cavity group 51. It will also be understood that in some embodiments, not all cavities will contain bodies/magnets.

At the cavity 83, the wall 102 defines a radially inner tip 120, a radially outer tip 122, a radially inner lateral wall section 124 and a radially outer lateral wall section 126 of the cavity 83. The wall 102 defines a space 128 into which the body 104 fits. In the current embodiment, the radially inner tip 120 and the radially outer tip 122 are curved for desirable magnetic properties but in other embodiments may be squared off or angled. For the purposes of the current embodiment, a tip is not necessarily the most extreme point of a structure but includes the surrounding part of the structure that defines its shape. For example, the radially outer tip 122 includes all, or substantially all, of that part of the wall 102 from the radially inner lateral wall section 124 to the radially outer lateral wall section 126. Similarly, the radially inner tip 120 includes all, or substantially all, of that part of the wall 102 from the radially outer lateral wall section 126 to the radially inner lateral wall section 124.

The radially inner lateral wall section 124 is substantially flat and includes a tab 130 located approximately mid-way between the radially inner tip 120 and the radially outer tip 122. The tab 130 is a part of the lamination 32 that extends further into the cavity 83 toward the radially outer lateral wall section 126 than the remainder of the radially inner lateral wall section 124. As a result, the tab 130 is a projection into the cavity 83 that engages the body 104 forcing it toward and against the radially outer lateral wall section 126 with a tunable preload force. The force is tunable by adjusting properties such as the size of the tab 130. In the current embodiment, the tab 130 is formed on a subset of the laminations 32, which is a number that is less than all of the laminations 32 in the rotor core 30. For example, the tab 130 may exist on only a few of the laminations of the stack length of the rotor core 30 (e.g., about 2-5 per cavity) so as not to cause excessive press force for insertion of the body 104 (magnet) or excessive preload. In additional embodiments, more tabs 130 may be used to provide a desirable preload.

The radially outer tip 122, or a part of the wall 102 adjacent thereto, includes a stop 132. The stop 132 may be formed by all of the laminations 32 in the rotor core 30 and projects into the cavity 83 forming a shoulder against which the body 104 may abut, stopping further movement into the radially outer tip 122. In other embodiments, the stop 132 may be included in less than all of the laminations 32 in the rotor core 30. Near the radially inner tip 120, the wall 102 defines a tab 134 that extends into the cavity 83. The tab 134 is a part of the lamination 32 that extends further into the cavity 83 toward the stop 132 and toward the radially outer lateral wall section 126. As a result, the tab 134 is a projection into the cavity 83 that engages the body 104 forcing it toward and against the stop 132 with a tunable preload force. In the current embodiment, the tab 134 is formed on a subset of the laminations 32, which is a number that is less than all of the laminations 32 in the rotor core 30. For example, the tab 134 exists on only a few of the laminations of the stack length of the rotor core 30 so as not to cause excessive press force for insertion of the body 104 (magnet) or excessive preload.

The body 104, which may be a magnet, extends through the rotor core 30 in a direction parallel to the axis 25 and as such, has a length extending through the cavity 83 in the axial direction. The body 104 has four sides 141-144 and four corners 145-148. Each of the sides 141-144 is flat/planar and each of the corners 145-148 is square, substantially so. The tab 130 engages the side 143 and forces (with a preload) the side 141 against the radially outer lateral wall section 126 of the cavity 83. The tab 134 engages the side 142 at the corner 146 and forces (with a preload) the side 144 at the corner 147 against the stop 132. The corners 146 and 147 share a common side 143 and are adjacent corners around the perimeter of the body 104. The preloads effected by the tabs 130 and 134 result in the body 104 being located in a seated position against the radially outer lateral wall section 126 and against the stop 132. A gap 157 is created between the body 104 and the radially inner lateral wall section 156. Through action of the tabs 130, 134, the seated position remains the same whether the rotor assembly 24 is in a stationary (nonrotating) state or in a speed (rotating) state.

At the cavity 85, the wall 110 defines a radially inner tip 150, a radially outer tip 152, a radially outer lateral wall section 154 and a radially inner lateral wall section 156 of the cavity 85. The wall 110 defines a space 158 into which the body 112 fits. In the current embodiment, the radially inner tip 150 and the radially outer tip 152 are curved for desirable magnetic properties but in other embodiments may be squared off or angled.

The body 112, which may be a magnet, extends in a direction parallel to the axis 25 and as such has a length extending axially through the cavity 85. The body 112 has four sides 161-164. The body 112 has four chamfered corners 165-168. This technically creates eight corner-like features but for purposes of the present embodiment, the four corners 165-168 of the body 112 are chamfered. For example, the corners 165-168 each include a respective form of beveled surface 171-174, at a 45° angle between the respective two adjoining right-angled faces of the sides 161-164.

At the cavity 85, the radially inner lateral wall section 156 is flat and faces the side 163 of the body 112. The radially outer lateral wall section 154 is also flat and faces the side 161 of the body 112. At or adjacent the radially outer tip 152, the wall 110 defines an angled section 180. The angled section 180 is a part of the wall 110 that is disposed at an angle (e.g. forty-five degree) relative to the radially inner lateral wall section 156 and that transitions, at its other (radially outer) end to the radially outer tip 152. The angled section 180 matches and faces the beveled surface 173 of the chamfered corner 167.

The radially inner tip 150, or a part of the wall 110 adjacent thereto, includes a tab 182. The tab 182 is a part of the lamination 32 that extends further into the cavity 83 toward the angled section 180 and toward the radially outer lateral wall section 154 as compared to adjacent parts of the wall 110. As a result, the tab 182 is a projection into the cavity 85 that engages the body 112 forcing it toward and along the angled section 180 and toward the radially outer lateral wall section 154 with a tunable preload force. The force resulting from the tab 182 operating together with a sliding action of the beveled surface 173 along the angled section 180 together preload the side 161 of the body 112 against the radially outer lateral wall section 154 and force the body 112 against the angled section 180. A gap 159 is created between the body 112 and the radially inner lateral wall section 124. In the current embodiment, the tab 182 is formed on a subset of the laminations 32, which is a number that is less than all of the laminations 32 in the rotor core 30. For example, the tab 182 exists on only a few (2-5) of the laminations of the stack length of the rotor core 30 so as not to cause excessive press force for insertion of the body 112 (magnet) or excessive preload. In other embodiments, a larger number of tabs 182 may be used.

The effect of the tab 182 is that the body 112 is positioned in the cavity 85 in a seated position that is maintained during static (nonrotating states) and during speed (rotating states) of the rotor assembly 24. In this embodiment, the body 112 is a magnet that is maintained against the radially outer lateral wall section 154. The effect of the tab 182 (which is a singular or sole tab in the cavity 85 an individual laminations 32) is that the body 112 is positioned in the cavity 85 in a seated position that is maintained during stationary (nonrotating states) and during rotating (speed states) of the rotor assembly 24 against the radially outer lateral wall section 154 and the angled section 180. The preload effected by the tab 182 is sufficiently large so that the body 112 remains in the same seated position whether the rotor assembly 24 is in a stationary state or in a speed state.

During manufacture, components of the rotor assembly 24 may be formed and then assembled and balanced prior to mating with the remaining parts of the electric machine 20. For example, the rotor assembly 24 may be spun in a rotor balancing machine and material may be selectively removed or added to perfect balance. It has been found as part of the current disclosure that, via rotor balance measurement studies, the clearance of the bodies/magnets in the cavities may cause changes in rotor imbalance. Having the bodies/magnets in a seated/final position in the rotor assembly 24 during balancing, and minimizing the overall movement of the magnets in the laminations during in-field operation where (electromagnetic forces and centrifugal forces can sometimes oppose each other), minimizes any change in balance and its potential impact on noise vibration and handling (NVH).

Figure 6:
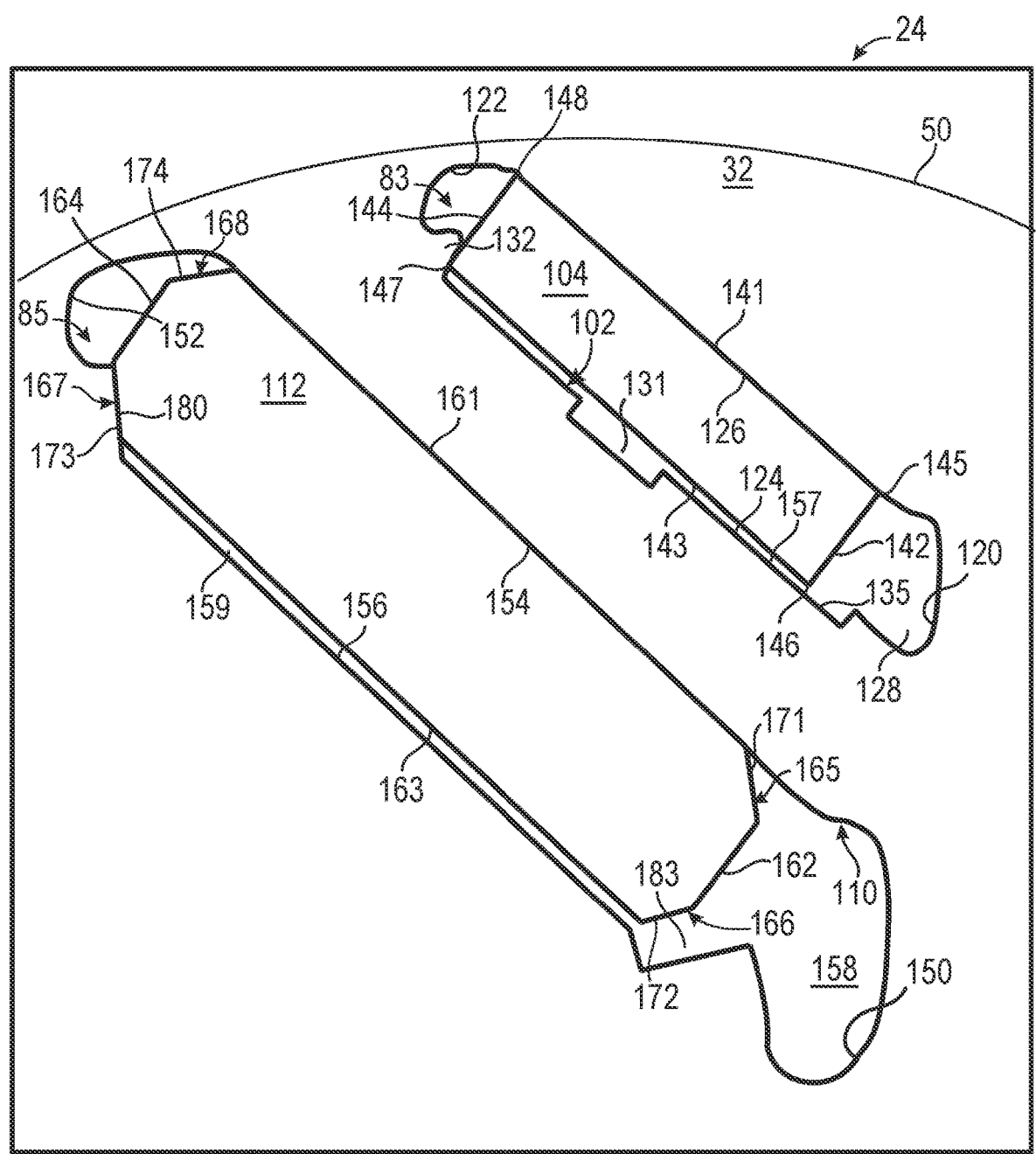
FIG. 6 is a fragmentary, sectional, schematic illustration of another part of the rotor of FIG. 2 across a part of a lamination without tabs, in accordance with various embodiments.

The lamination 32 of FIGS. 4 and 5 is included in a first subset of the laminations 32 in the rotor core 30 that include at least one tab 130, 134, 182. Referring to FIG. 6, a lamination 32 is illustrated that is included in a second subset of the laminations 32 in the rotor core. The lamination 32 of FIG. 6 does not include any of the tabs 130, 134, 182, but does include the stop 132. During manufacture of the laminations 32, such as by stamping or another method, the laminations 32 in both subsets may first be formed with the tabs 130, 134, 182. Then, the tabs 130, 134, 182 may be removed, such as by stamping, shearing, or another method. As a result, the areas of the removed tabs 130, 134, 182 have voids that may be referred to as cutouts 131, 135, 183.

Figure 7:
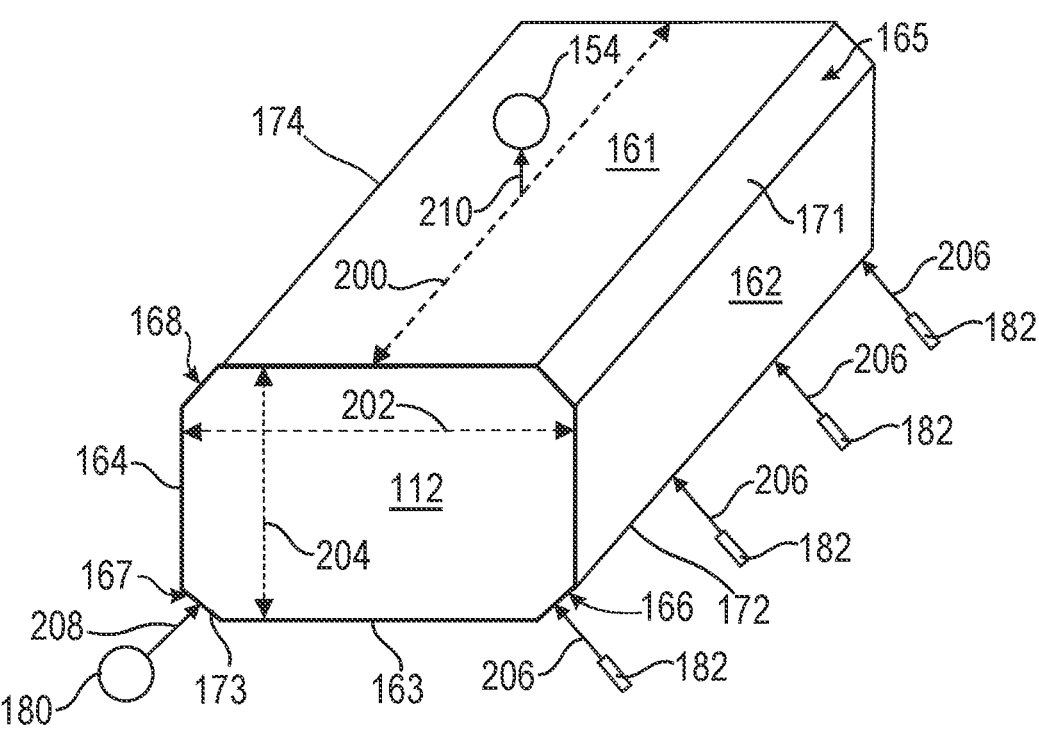
FIG. 7 is a schematic, perspective illustration of a magnet of the rotor of FIG. 2, in accordance with various embodiments.

Referring to FIG. 7, the body 112 is shown schematically in its preloaded state. The body 112 has a length 200 in the same direction as the axis 25. The body 112 has a width 202 and a thickness 204. The body 112 has the sides 161-164. The body 112 has the chamfered corners 165-168 forming the beveled surfaces 171-174. The tabs 182 apply a preload 206 to the body 112 at the corner 166. This forces the body 112 against the angled section 180 and the angled section 180 of the wall 110 applies a reaction force 208 to the body 112. The preload 206 and the reaction force 208 preload the body 112 against the radially outer lateral wall section 154 with a force 210, which applies an equal and opposite force to the body 112. As a result, the body 112 is maintained by the forces in a seated position against the radially outer lateral wall section 154 and does not move during any of stationary states, balancing states or operational states of the rotor assembly 24.

Figure 8:
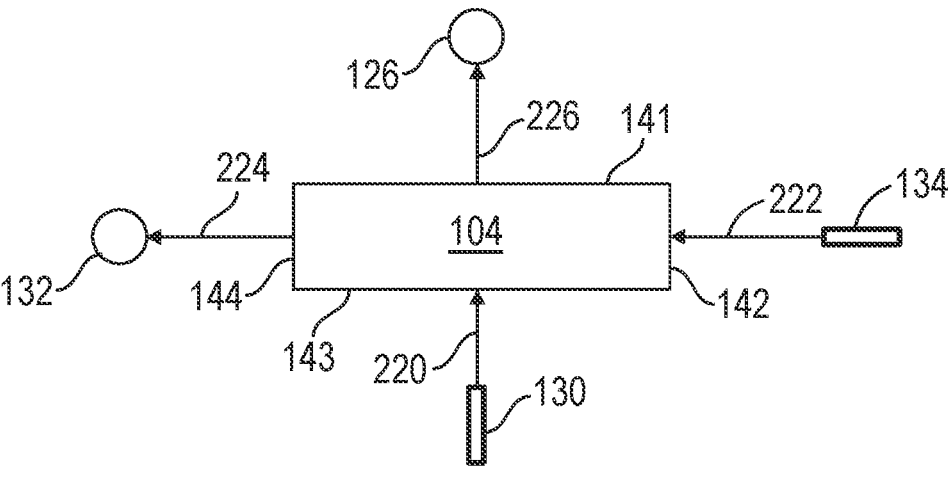
FIG. 8 is a schematic, cross sectional illustration of a magnet of the rotor of FIG. 2, in accordance with various embodiments.

Referring to FIG. 8, the body 104 is shown schematically in its preloaded state. The body 104 has the sides 141-144. The tabs 130 and 134 preload the body 104 against the stop 132 and against the radially outer lateral wall section 126 with forces 220 and 222, respectively. The body 104 applies a force 224 to the stop 132 and a force 226 to the radially outer lateral wall section 126. The stop 132 balances the force 224 with a reaction force and the radially outer lateral wall section 126 balances the force 226 with a reaction force. As a result, the body 104 is maintained by the forces in a seated position against the radially outer lateral wall section 126 and does not move during any of stationary states, balancing states or operational states of the rotor assembly 24.

Figures 9, 10:
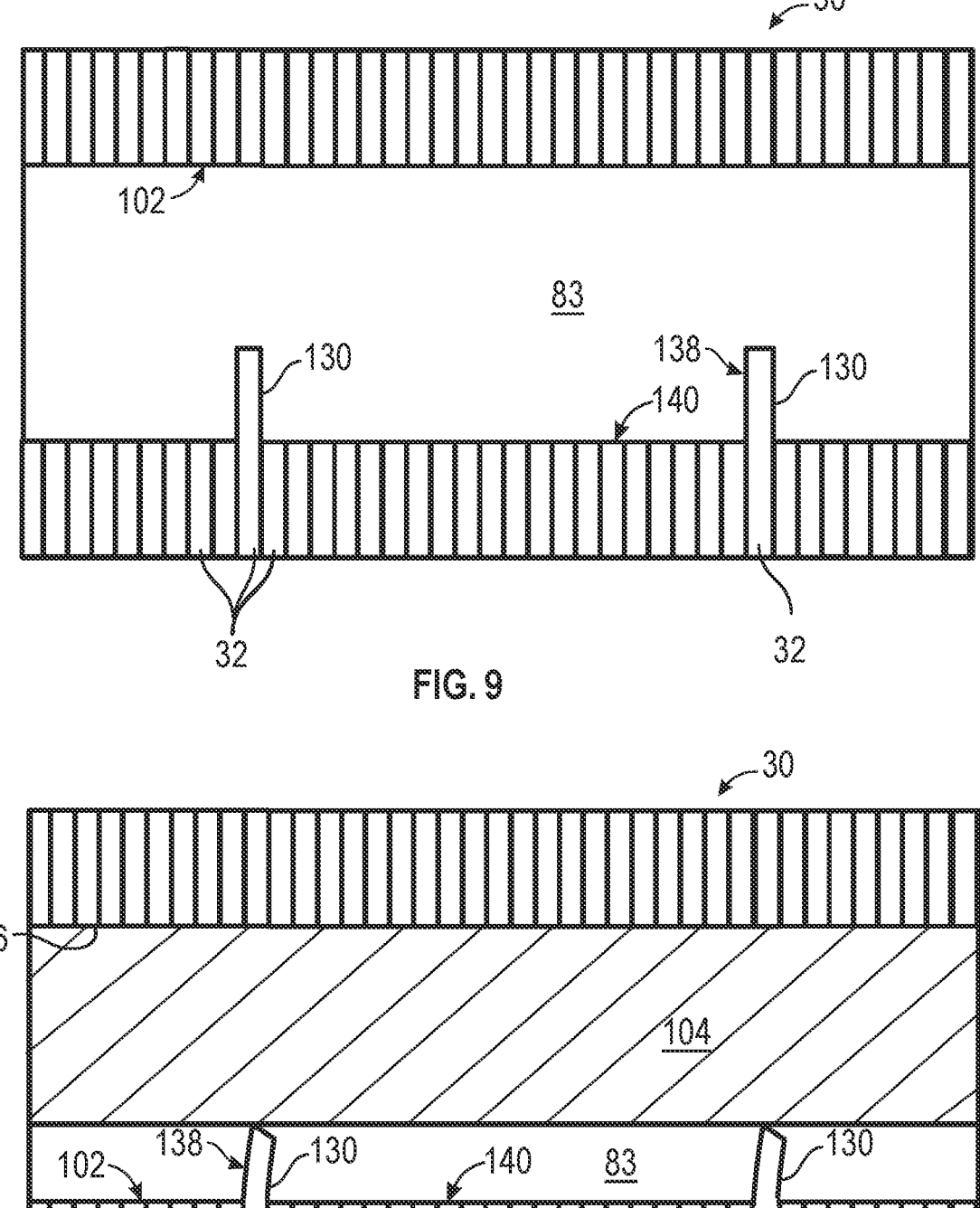
FIG. 9 is a fragmentary, sectional, schematic illustration of a part of the rotor of FIG. 2 across a part of the rotor core in a before magnet inserted state, in accordance with various embodiments.
FIG. 10 is a fragmentary, sectional, schematic illustration of another the part of the rotor of FIG. 9 across a part of the rotor core in a magnet inserted state, in accordance with various embodiments.

Referring to FIG. 9, a schematic illustration of the longitudinally sectioned rotor core 30 is shown at the area of the cavity 83 without the body 104 being inserted. The laminations 32 include a subset 138 that includes less than all of the laminations 32 and in this embodiment laminations 32 include two laminations 32 with tabs 130 that extend radially outward and into the cavity 83 further than others of the laminations 32. In other embodiments, another number of the tabs 130 may be included. The laminations 32 that do not include the tabs 130 collectively form another subset 140. Before the body 104 is inserted into the cavity 83, the tabs 130 are presented in a straight disposition projecting in the radial direction into the cavity 83. Referring to FIG. 10, after the body 104 is inserted into the cavity 83, the tabs 130 on selective ones of the laminations 32 may bend and as a result, apply a force to the body 104. This preloads the body 104 against the radially outer lateral wall section 126. The tabs 130, and for that matter the tabs 134, 182, are tuned to apply a selected preload to their respective bodies 104, 112 in a radially outward direction. In other embodiments, the tabs 130 are configured to apply a preload without interfering with insertion of the magnets and/or without a need to bend.

Accordingly, tab systems selectively place electric motor rotor magnets into desired positions in lamination slots to provide desirable balance properties. The tab systems locate the magnets during balancing operations and during operation of the rotor. The tab systems minimize magnet movement during and after balancing operation. Minimizing magnet movement minimizes potential changes in rotor balance. The tab systems also locate the magnets in a centered seated position. The tab systems may employ lamination tabs to apply preload on the chamfer of certain magnets causing a reaction with angled cavity walls on the at the other end of the magnets. This enables the use of just one tab on the chamfered magnets to apply preload in both directions (along the thickness and width of the magnets). In cases where the magnets do not have a chamfer, two lamination tabs may be used, one to apply the preload in the thickness direction of the magnet, and another to apply the preload in the width direction of the magnet. Positioning the magnets reduces the starting imbalance of the rotor assembly 24 and reduces the need to add balancing holes. The magnets are also positioned and subjected to a preload force to prevent their movement during operational speeds.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor for an electric machine comprising:
   a rotor core having at least one cavity internal to the rotor core, the at least one cavity defined by a wall of the rotor core, the wall comprising a radially inner lateral wall section, a radially outer lateral wall section, a radially inner tip extending between the radially inner lateral wall section and the radially outer lateral wall section at a first end of the cavity, and a radially outer tip extending between the radially inner lateral wall section and the radially outer lateral wall section at a second end of the cavity that is opposite the first end of the cavity;
   laminations stacked together to form the rotor core, including to form the at least one cavity; and
   a body extending within the at least one cavity,
   wherein the laminations in a subset of the laminations each include a tab system with tabs configured to preload the body to a seated position against the wall, and to maintain the body in the seated position,
   wherein the tabs are disposed at a first corner of the body that is located at a first wall junction that is where the radially inner lateral wall section and the radially inner tip meet each other,
   wherein none of the tabs are disposed at a second corner of the body that is located at a second wall junction where the radially inner lateral wall section and the radially outer tip meet each other, and wherein at the second corner the wall forms a stop that mates with a side of the body or forms an angled section of the wall that mates with a beveled surface of the body,
   wherein the tabs are configured to force the body against both the radially outer lateral wall section and against the stop or the angled section of the wall.

2. The rotor of claim 1, wherein the body comprises a magnet.

3. The rotor of claim 1, wherein the body includes chamfered corners, wherein the at least one tab comprises one tab only on each of the laminations in the subset of laminations, wherein the one tab engages the body at one of the chamfered corners.

4. The rotor of claim 1, wherein:
   the body includes chamfered corners,
   the at least one tab comprises one tab, only,
   the one tab engages the body at one of the chamfered corners, and
   the wall includes the angled section that engages the body at another of the chamfered corners.

5. The rotor of claim 1, wherein:
   the subset of the laminations is a first subset of the laminations,
   the laminations include a second subset of the laminations that is different than in the first subset of the laminations,
   the laminations in the second subset of the laminations do not include the tabs and are free of structures that apply force to the body,
   the laminations in the second subset of the laminations do include the angled section or the stop.

6. The rotor of claim 1, wherein the at least one tab is not included on a majority of the laminations.

7. The rotor of claim 1, wherein the wall defines the stop, wherein the tabs include side tabs on the radially inner lateral wall section that force the body against the radially outer lateral wall section.

8. The rotor of claim 1, wherein the at least one tab is configured to define a press-fit between the body and the wall to establish the preload.

9. The rotor of claim 1, wherein:
   the at least one cavity includes groups of cavities disposed to define struts and bridges and flux path elements, and the angled section and the stop are formed by areas of the laminations on an opposite side of the body from the struts and the bridges and the flux path elements.

10. The rotor of claim 1, wherein the rotor is configured to be in a stationary state and to operate by rotating at a speed state, wherein the preload is tuned to maintain the body in the seated position during both the stationary state and the speed state.

11. A rotor for an electric machine comprising:

a rotor core having cavities internal to the rotor core, the cavities defined by a wall of the rotor core;

laminations stacked together to form the rotor core, the laminations defining the cavities, wherein for each cavity in the cavities, the wall comprises a radially inner lateral wall section, a radially outer lateral wall section, a radially inner tip extending between the radially inner lateral wall section and the radially outer lateral wall section at a first end of the cavity, and a radially outer tip extending between the radially inner lateral wall section and the radially outer lateral wall section at a second end of the cavity that is opposite the first end of the cavity; and a body comprising a magnet extending within each of the cavities, wherein the laminations in a subset of the laminations each include a tab system with tabs configured to preload the body to a seated position against the wall, and to maintain the body in the seated position, wherein the tabs are disposed at a first corner of the body that is located at a first wall junction that is where the radially inner lateral wall section and the radially inner tip meet each other, wherein none of the tabs are disposed at a second corner of the body that is located at a second wall junction where the radially inner lateral wall section and the radially outer tip meet each other, and wherein at the second corner the wall forms a stop that mates with a side of the body or forms an angled section of the wall that mates with a beveled surface of the body, wherein the tabs are configured to force the body against both the radially outer lateral wall section and against the stop or the angled section of the wall.

12. The rotor of claim 11, wherein the body includes chamfered corners, wherein the subset of the laminations each include one tab only, as the tab, wherein the one tab engages the body at a chamfered corner of the magnet.

13. The rotor of claim 11, wherein:

the magnet includes chamfered corners, the tabs comprise one tab, only, per cavity of the cavities the one tab engages the body at one of the chamfered corners, and the wall includes the angled section that engages the body at another of the chamfered corners.

14. The rotor of claim 11, wherein:

the subset of the laminations is a first subset of the laminations, the laminations include a second subset of the laminations that is different than the first subset of the laminations, the laminations in the second subset of the laminations do not include the tabs and are free of structures that apply force to the body, the laminations in the second subset of the laminations do include the angled section or the stop.

15. The rotor of claim 11, wherein the subset of the laminations is a minority of the laminations so that the tabs are not included on a majority of the laminations.

16. The rotor of claim 11, wherein the wall defines the stop, wherein the tabs includes side tabs on the radially inner lateral wall section that force the body against the radially outer lateral wall section.

17. The rotor of claim 11, wherein the tabs are configured to define a press-fit between the magnet and the wall to establish the preload, with a gap defined between the wall and the magnet adjacent the at least one tab.

18. The rotor of claim 11, wherein:

the at least one cavity includes groups of cavities disposed to define struts and bridges and flux path elements, and the angled section and the stop are formed by areas of the laminations on an opposite side of the body from the struts and the bridges and the flux path elements.

19. The rotor of claim 11, wherein the rotor is configured to alternately be in a stationary state and to operate by rotating at a speed state, wherein the preload is tuned to maintain the magnet in the seated position during both the stationary state and the speed state.

20. A rotor for an electric machine comprising:

a rotor core having cavities internal to the rotor core, the cavities defined by a wall of the rotor core;

laminations stacked together to form the rotor core, the laminations defining the cavities, wherein for each cavity in the cavities, the wall comprises a radially inner lateral wall section, a radially outer lateral wall section, a radially inner tip extending between the radially inner lateral wall section and the radially outer lateral wall section at a first end of the cavity, and a radially outer tip extending between the radially inner lateral wall section and the radially outer lateral wall section at a second end of the cavity that is opposite the first end of the cavity; and a magnet extending within each of the cavities, wherein each of the laminations in a first subset of the laminations includes a tab system with a tab configured to preload the magnet to a seated position against the wall, and to maintain the magnet in the seated position, wherein the tab is disposed at a first corner of the magnet that is located at a first wall junction that is where the radially inner lateral wall section and the radially inner tip meet each other, wherein no tab is disposed at a second corner of the magnet that is located at a second wall junction where the radially inner lateral wall section and the radially outer tip meet each other, and wherein at the second corner the wall forms a stop that mates with a side of the magnet or forms an angled section of the wall that mates with a beveled surface of the magnet, wherein the tab is configured to force the body against both the radially outer lateral wall section and against the stop or the angled section of the wall, wherein each of the laminations in a second subset of the laminations does not include the tab.

* * * * *